INVENTOR
MARTIN BARAM

United States Patent Office 3,532,265
Patented Oct. 6, 1970

3,532,265
FLUID CONTROLLED MEMBRANE VALVE FOR CENTRIFUGES
Martin Baram, Brondby Strand, Denmark, assignor to Alfa-Laval Aktiebolag, Tumba, Sweden, a company of Sweden
Filed Feb. 26, 1969, Ser. No. 802,435
Int. Cl. B04b *11/00*
U.S. Cl. 233—20    6 Claims

ABSTRACT OF THE DISCLOSURE

Fluid controlled membrane valve for centrifuge bowl to open and close the discharge apertures of said bowl.

BACKGROUND OF THE INVENTION

Field of the invention.—The present invention relates to a new fluid controlled membrane valve, more particularly to an annular membrane valve attached to a rotating body such as a centrifugal separator bowl to open and close one or several openings in said body.

Description of the prior art.—According to U.S. Pat. 3,281,068, it is known to utilize an annular fluid controlled resilient sealing member mounted in a groove in the ejection gap between two opposed parts of a centrifugal separator bowl. This sealing member suffers from the disadvantage that the area of its sealing face is equal to or even larger than the face exposed to the action of the control fluid. Another drawback is the fact that the movements of the sealing member depend mainly on the resiliency of the central portion, including the stretchable side walls. As a result of both factors, the sealing ability of the member is limited, and the second factor in addition limits the range of material available to fabricate the member of highly resilient compounds which are not always sufficiently resistant to chemical action.

U.S. Pat. 3,393,863, shows an annular elastic shut-off device where the sealing area is considerably smaller than the area of the face exposed to the action of the control fluid. However, this device too is exclusively based on the use of resilient material with the result that the original configuration is deformed under centrifugal stress to such an extent that the sealing face swells upon contact with the opposite part of the bowl over an area that may be equal to the face exposed to the control fluid. Another drawback of this configuration is that the sealing member may expand outwardly uncontrollably to varying degrees, thus changing the volume of the bowl to an extent that is intolerable in laboratory work.

SUMMARY OF THE INVENTION

The object of the present invention is to provide a hydraulically controlled membrane valve which under all centrifugal stresses retains the advantageous relative ratio of sealing area versus pressure area, which cannot expand outwardly under centrifugal stresses, and the movements of which do not depend on the resilience of its material but on its pliability alone, thus enabling the introduction into the art various materials that are highly resistant to chemical action.

Another object of the invention is to provide a hydraulically controlled membrane valve furnished with borings to replace the usual evacuation vents for the control fluid and/or to permit some of the control fluid to enter the interior of the sealed bowl in order to soften up certain kinds f sedimentations and to make the ejection surfaces more slippery, thus facilitating the emptying of the bowl.

A further object of the invention is to provide a hydraulically controlled membrane valve furnished with a number of auxiliary valves governing evacuation vents for the control fluid in order to limit the amount of control fluid necessary to maintain the valve in a sealing position, while at the same time accelerating the evacuation of the control fluid once the supply is stopped, with the beneficial result that the membrane valve collapses entirely away from the ejection slit.

A still further object of the invention is to provide a hydraulically controlled membrane valve which is highly resistant to abrasive action.

These and other novel features and advantages of the present invention will be described and defined in the following specification and claims.

DESCRIPTION OF THE PREFERRED EMBODIMENTS

Figure 1:
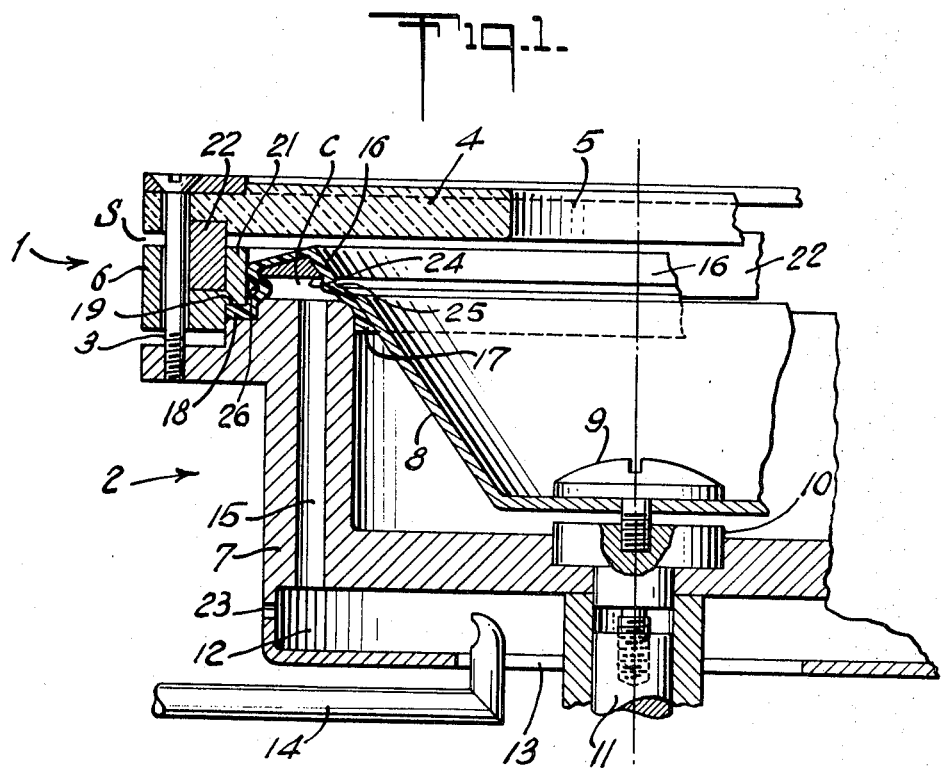
FIG. 1 is a detailed vertical sectional view of a centrifugal separator bowl furnished with a membrane valve of the present invention, the portion to the right of the schematic vertical axial line being fragmented, but to be understood as being symmetrical with the equivalent representation to the left of said line.

Referring now more specifically to the drawing wherein the various parts are circular unless otherwise indicated, a portion of a centrifugal separator bowl is shown in FIG. 1 for illustrative purposes, said bowl comprising an upper part and a lower part, generally designated 1 and 2, respectively, and which are held together by screws 3. The upper part 1 is in this specific instance a transparent disc 4 with a central opening 5 through which centrifugation material may be introduced into the bowl, and a pressure distribution ring 6 which supports the heads of screws 3. The lower part 2 comprises a rotor body 7 which contains an inner cup 8 held in place by an axial center screw 9 threadably engaging a nut 10 which extends through the floor of body 7 and is attached to shaft 11 rotated by sitable means such as an electric motor, not shown.

Rotor body 7 is further furnished with a lower annular chamber 12 having an axial opening 13 through which there extends the vertical end portion of a stationary pipe 14, said end portion having an exit port through which fluid under pressure in said pipe is projected into chamber 12. Substantially evenly distributed in the circular wall of rotor body 7 is a plurality of spaced apart vertical channels 15, the lower ends of which communicate with distribution chamber 12.

The upper ends of channels 15 communicate with an annular pressure chamber C formed in the interior of a hydraulically controlled annular membrane valve 16, the floor of said pressure chamber being formed by the upper end of the circular wall of rotor body 7. The lower ends of the obliquely and downwardly extending annular legs 17 and 18 of valve 16 are secured, respectively, by the upper annular rim of inner cup 8 and by an annular shoulder 19 or ring 6. Located in suitable recesses in and clamped between disc 4 and ring 6 is a purality of circumferentially spaced apart spacer elements 22 that separate said disc and said ring to define one or more circumferential apertures or discharge ejection slits S.

When the bowl is rotating, control fluid under pressure from a suitable source, not shown, is injected by pipe 14 into chamber 12 and flows through channels 15 into pressure chamber C where, by virtue of centrifugal force, said fluid causes the inverted V-shaped central portion of membrane valve 16 to move upwardly until its apex presses against the bottom surface of disc 4, thereby effectively sealing ejection slit S. Some of the control fluid escapes through a plurality of circumferentially spaced apart small ports 23 communicating with chamber 12, but as long as the supply of control fluid exceeds the loss through ports 23, valve 16 will remain in its sealing position. When the supply of control fluid is stopped, pressure will be reduced within chamber C and the center portion of valve 16 will retract to its normal position to open slit S as shown in FIG. 1.

Valve 16 comprises a body of a pliable material and may include a stiff reinforcing ring 24 which is bonded to the interior upper portion of said valve. Legs 17 and 18 of valve 16 each have at least one bellows-like ridge 25 and 26, respectively, which permit the raising and lowering of the center portion of valve 16 for closing and opening slit S. Valve 16 and its integrally formed legs 17 and 18 are formed of a highly chemically resistant material, such as Teflon, or the like, while the physical nature of valve 16 is pliable but neither resilient nor elastic and has suitable mechanical strength. Reinforcement ring 24 may be made of any suitable water or oil resistant mechanically strong material which is securely bonded to the interior central portion of valve 16.

Figure 2:
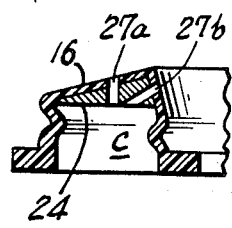
FIG. 2 is an enlarged vertical sectional view of an alternative embodiment of a membrane valve furnished with borings to vent the control fluid.

In an alternative embodiment as shown in FIG. 2, valve 16 is provided with circumferentially spaced apart bores 27 extending also through ring 24 and piercing the valve at any suitable point. When extending through the outer slope of the apex of valve 16 as indicated by bores 27a, they may replace the usual parts 23 in all cases where the admixture of water or other control fluid to the ejected sludge does not do any harm or even is advantageous. In case of difficult sludge material, it may be advantageous to divert some of the control fluid into the bowl by means of bores 27b in the interior slope of valve 16 directed toward the ejection area so that the sludge is moistened to a degree and may even be kept floating and mobile prior to being ejected. Depending upon the particular types of materials that are centrifuged in the apparatus, either one or both of bores 27a and 27b may be incorporated in valve 16.

Figure 3:
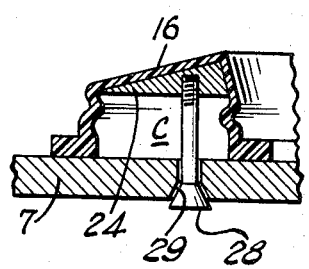
FIG. 3 is a vertical sectional view of still another embodiment of the membrane valve and an alternative supporting part of the bowl with one of several auxiliary valves governing suitably shaped vents for the control fluid.

FIG. 3 illustrates another useful embodiment of valve 16 according to the invention. A plurality of space apart mushroom valves 28 extend through suitably shaped corresponding valve-seat openings 29 in the supporting portion or rotor body 7 and are screwed fast in tapped holes in reinforcement ring 24. Such auxiliary valves 28 may work either in conjunction with ports 23 or with bores 27a or 27b or even without either, if said valves themselves provide for a minimal amount of leakage.

The advantage of this arrangement lies in the fact that the natural movement of valve 16 is exploited to limit the amount of control fluid vented during the sealing period, and to cause a sudden and thorough withdrawal of valve 16 from its sealing position when the supply of fluid is stopped. This can be of great importance in those instances when occasional ejections from inner cup 8 occur only after relatively long periods of centrifugation. Thus, great amounts of control fluid or the equivalent pumping energy in closed fluid circulation are saved. A little trickle of control fluid vented is sufficient to trigger the total and rapid discharge of all control fluid when the supply is stopped. In order to re-establish pressure in chamber C, and thus to move valve 16 into sealing position, it is necessary to inject a short burst of control fluid into the rotating pressure system at a rate that exceeds losses through all ports. Immediately valve 16 will expand and close at the same time as auxiliary valves 28. From then on, valve 16 will remain in sealing position by means of a very limited amount of fluid only.

Figure 4:
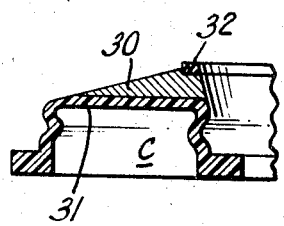
FIG. 4 is a vertical sectional view of another form of a membrane valve furnished with an exterior reinforcement ring with a pliable sealing face.

FIG. 4 exemplifies yet another advantageous embodiment of the valve structure in accordance with the invention. A reinforcement ring 30 is bonded on the top of a valve body 31 similar in function to valve 16, said ring 30 being directly in the path of the material ejected from cup 18, said ring being useful in that position when very abrasive materials are being centrifuged. In that case, the actual sealing function is performed by a narrow annular strip 32 made of a suitably resilient material and removably mounted on the apex of ring 30. When it becomes worn or otherwise damaged, strip 32 may be replaced several times before the rest of the valve is worn out.

While the preferred embodiments of the present invention have been shown and described herein, it is obvious that many structural details may be changed without departing from the spirit and scope of the appended claims.

I claim:

1. A fluid controlled membrane valve attached to a rotating body such as a centrifugal separator bowl for opening and closing at least one peripheral discharge opening in said body, said valve comprising an annular central portion, a pair of spaced apart integrally formed legs which define a pressure chamber therebetween, said legs each having at least one annular bellows-like ridge therein, said valve including said central portion and said legs being formed of a pliable but inelastic material that is mechanically strong and chemically resistant, said bellows ridges in said legs permitting the opening and closing movement of the central portion of said valve in accordance with the corresponding lowering and increasing of pressure of fluid present in said chamber.

2. A membrane valve according to claim 1 and further comprising an annular reinforcement ring mounted on the interior of the central portion of said valve, said reinforcement ring being suitably fluid-resistant and stiff.

3. A membrane valve according to claim 1 wherein the central portion thereof has an inverted V-shape, a plurality of spaced apart bores in said central portion extending therethrough and communicating with said pressure chamber, said bores extending through the outer slope of said central portion for discharging control fluid out of said rotating body.

4. A membrane valve according to claim 1 wherein the central portion there of has an inverted V-shape, a plurality of spaced apart bores in said central portion extending therethrough and communicating with said pressure chamber, said bores extending through the inner slope of fsaid central portion for discharging control fluid into said rotating body.

5. A membrane valve according to claim 1 and further comprising at least one auxiliary valve connected between said central portion of said valve and the rotor body, said auxiliary valve being operated by the movement of said valve in response to the pressure conditions within said pressure chamber.

6. A membrane valve according to claim 1 and further comprising an annular reinforcement ring mounted upon the exterior of said central portion of said valve, said reinforcement ring having an inverted V-shape and an annular sealing member removably mounted upon the apex of said reinforcement ring for producing the sealing action of said valve in response to increased pressure within said pressure chamber.

References Cited

UNITED STATES PATENTS

| 3,281,068 | 10/1966 | Baram | 233—20 |
| 3,393,863 | 7/1968 | Baram | 233—20 |

WILLIAM I. PRICE, Primary Examiner

U.S. Cl. X.R.

233—46